(12) United States Patent
Proidl

(10) Patent No.: US 6,907,506 B2
(45) Date of Patent: Jun. 14, 2005

(54) SECURITY DEVICE FOR A MASS STORAGE

(75) Inventor: Adolf Proidl, Vienna (AT)

(73) Assignee: Koninklijke Philips Electronics N.V., Eindhoven (NL)

(*) Notice: Subject to any disclaimer, the term of this patent is extended or adjusted under 35 U.S.C. 154(b) by 163 days.

(21) Appl. No.: 10/274,395

(22) Filed: Oct. 18, 2002

(65) Prior Publication Data
US 2003/0079098 A1 Apr. 24, 2003

(30) Foreign Application Priority Data
Oct. 24, 2001 (EP) ............................................. 01000565

(51) Int. Cl.[7] .............................................. B06F 12/00
(52) U.S. Cl. ........................ 711/162; 711/112; 711/173
(58) Field of Search .......................... 711/14, 112, 114, 711/161–162, 173, 207–208; 713/1–2, 100; 714/15–16

(56) References Cited

U.S. PATENT DOCUMENTS

| 4,638,424 A | * | 1/1987 | Beglin et al. ................ 711/117 |
| 5,454,101 A | * | 9/1995 | Mackay et al. ................. 707/3 |
| 5,594,881 A | * | 1/1997 | Fecteau et al. .............. 711/209 |
| 5,778,394 A | * | 7/1998 | Galtzur et al. .............. 707/205 |
| 5,878,460 A | * | 3/1999 | Bruce ........................... 15/160 |
| 6,205,558 B1 | | 3/2001 | Sobel ........................... 714/15 |
| 6,226,759 B1 | * | 5/2001 | Miller et al. ................... 714/6 |

OTHER PUBLICATIONS

Dixon, Apr. 1993, IEEE, pp. 25–30.*
Hardware White Paper, "FAT: General Overview of On–Disk Format," Version 1.02, May 5, 1999, Microsoft Corporation, pp. 5–25.

* cited by examiner

Primary Examiner—Donald Sparks
Assistant Examiner—Brian R. Peugh

(57) ABSTRACT

A storage management device (5, 12) is intended for managing data storage areas (DSB) of a mass storage, such as a hard disk (5), for example,. Associated data storage areas (ID1, ID2, ID3) of the mass storage are concatenated by concatenation data (VD). The storage management device (5, 12) contains backup means (12) in order to determine backup data (SD), before overwriting the concatenation data (VD) with modified concatenation data (GVD), the backup data (SD) identifying the modified concatenation data (GVD) to be stored on the mass storage. If the process of storing the modified concatenation (GVD) is unexpectedly interrupted, the storage management device (5, 12) is designed to determine valid concatenation data (VD, GVD).

10 Claims, 2 Drawing Sheets

SECURITY DEVICE FOR A MASS STORAGE

The invention relates to a storage management device for managing storage areas of a mass storage, it being possible by means of the mass storage to store concatenation data in management storage areas, which define a concatenation of data storage areas, in which associated information data can be stored on the mass storage, having storage control means for determining data storage areas identified by the concatenation data as unassigned, and for determining modified concatenation data, which identify a concatenation modified by writing information data to be stored to unassigned data storage areas, and having buffer storage means for buffer storing the modified concatenation data, and having writing means for writing the information data to be stored to unassigned data storage areas determined by the storage control means and for writing all the modified concatenation data to a first concatenation subarea and to a second concatenation subarea of the management storage area.

The invention further relates to a storage management method for managing storage areas of a mass storage, it being possible by means of the mass storage to store concatenation data in management storage areas, which define a concatenation of data storage areas, in which associated information data can be stored on the mass storage, the method comprising the steps of:

determining data storage areas identified by the concatenation data as unassigned;

determining modified concatenation data, which identify a concatenation modified by writing information data to be stored to unassigned data storage areas;

buffer storing the modified concatenation data;

writing the information data to be stored to unassigned data storage areas determined;

writing all the modified concatenation data to a first concatenation subarea and to a second concatenation subarea of the management storage area.

Such a storage management device and such a storage management method are disclosed by the document U.S. Pat. No. 6,205,558 and are designed for managing storage areas of a hard disk provided in a computer. The storage areas of the known hard disk contain data storage areas divided into clusters, in which information data are stored. Management storage areas of the known hard disk contain directory data and concatenation data of a so-called "File Allocation Table". The concatenation data are stored in a first concatenation subarea and as backup copy in a second concatenation subarea. In a boot storage area, boot data are also stored, which are read out by the computer immediately after switching on the computer, in order to start up a computer operating system program.

The information data of each file stored on the hard disk (e.g. text file, graphics file, audio file, . . . ) are stored in a plurality of associated data storage areas, which are linked by a start address identified by the directory data, and by a concatenation predetermined by the concatenation data.

The known storage management device contains storage control means by means of which the directory data and the concatenation data from the management storage areas of the hard disk can be read out in order to identify unassigned data storage areas, in which information data of a file that is to be stored can be stored. When such unassigned data storage areas have been found, the information data from the file to be stored are written to or stored in the unassigned data storage areas by the writing means. The directory data modified by writing in the information data and modified concatenation data are stored in buffer storage means of the known computer, said buffer storage means taking the form of a random access memory (RAM).

After writing in the information data, the writing means overwrite the previously stored directory data and concatenation data with the modified directory data and modified concatenation data. In the event of an unscheduled interruption in writing in these modified directory data and concatenation data (e.g. in the event of power failure, reset, . . . ) the directory data and concatenation data previously stored might have been partially overwritten, which may temporarily result in the loss of all concatenations of the stored data storage areas and hence temporarily in the loss of all information data stored on the hard disk. This temporary loss of concatenations can possibly be restored by a so-called checkdisk program, but this is very time-consuming and virtually impossible for larger hard disk storage capacities. In order to prevent such a loss in the case of boot data stored in the boot storage area, the known storage management device has backup means.

The known backup means are designed, before overwriting boot data, to store all boot data stored in a boot storage area to another storage area of the hard disk and to store a recovery program in the boot storage area. If the boot data have been successfully overwritten without any unscheduled interruption, the recovery program in the boot storage area is finally overwritten by the modified boot data. If, on the other hand, an unscheduled interruption has occurred during storage of the boot data, the next time the computer is started up, the recovery program is run, which stores the data from the original boot storage area stored in the other storage area of the hard disk, to the boot storage area again. This ensures that the computer can at least be started by using the operating system program that was stored in the boot storage area prior to storage of the modified boot data.

In the known storage management device and the known storage management method the fact that the storage of a recovery program only ever works for one processor type (Intel, Macintosh, . . . ), which can also run the recovery program, has proved to be a disadvantage. If the hard disk is an interchangeable medium, for example, and the unanticipated interruption into writing the modified concatenation data occurs as a result of the removal of the hard disk from the computer, another computer having a different type of processor, into which the hard disk is then inserted, is no longer capable of reading the information data stored on the hard disk.

It has furthermore emerged that, if problems occur in reading out information data stored on a hard disk, the check disk program is generally activated, which searches associated data storage areas with reference to the directory data and concatenation data stored in the management storage area, these data storage areas being concatenated by pointers so that at least these information data can still be read out. A further advantage here has proved to be that after an unanticipated interruption during the storage of the recovery program to the boot storage area, the checkdisk program has no facility for recovering concatenations in order to make information data readable.

Another disadvantage to this checkdisk program has proved to be that it takes approximately 15 minutes to check and recover the concatenation of a 2 Gbyte hard disk, thereby in practice making it unusable for a 10 Tbyte hard disk, for example, especially since the time taken to run the checkdisk program does not increase linearly but at least as the square of the storage capacity of the hard disk.

The object of the invention is to create a storage management device of the generic type specified in the opening paragraph and a storage management method of the generic type specified in the second paragraph, in which the aforementioned disadvantages are avoided.

In order to achieve the aforementioned object, backup means are provided in such a storage management device for determining backup data identifying the modified concatenation data to be written, and the writing means are furthermore designed, before writing the modified concatenation data to the first and the second concatenation subarea, to write the backup data to a backup subarea of the management storage area, and the backup means are furthermore designed, following an unscheduled interruption in writing the modified concatenation data, to determine by reference to the backup data, whether the concatenation data stored in the first concatenation subarea or in the second concatenation subarea form valid concatenation data.

In order to achieve the aforementioned object, such a storage management method comprises the further steps of:

determining backup data identifying the modified concatenation data to be written, and writing the backup data to a backup subarea of the management storage area before writing the modified concatenation data to the first and the second concatenation subarea, and determining by reference to the backup data, following an unscheduled interruption in writing of the modified concatenation data, whether the concatenation data stored in the first concatenation subarea or in the second concatenation subarea form valid concatenation data.

The features according to the invention mean that before writing the modified concatenation data—that is to say before overwriting the concatenation data stored in the concatenation subarea with the modified concatenation data—backup means determine backup data, which identify the modified concatenation data. If then during the writing of all the modified concatenation data there is a temporary, unscheduled interruption during the first concatenation subarea and then in the second concatenation subarea, it is possible on restarting the computer to determine from the stored backup data whether the backup data match the concatenation data stored in the first concatenation area.

If the backup data match the concatenation data stored in the first concatenation area, the writing was only interrupted after valid completion of the modified concatenation data in the first concatenation area, and the modified concatenation data stored in the first concatenation data area can now also be stored in the second concatenation data area. This affords the advantage that even the most recently stored information data in the new file can be validly read out again, so that no information data have been lost due to the unscheduled interruption.

If, on the other hand, the backup data do not match the concatenation data stored in the first concatenation area, the writing of the modified concatenation data was already subject to unscheduled interruption in the first concatenation data area, so that the concatenation data stored in the first concatenation data area are not valid. In this case, the original concatenation data stored in the second concatenation data area can now be copied to the first concatenation data area. This affords the advantage that all information data stored on the hard disk, except for the information data in the most recently stored new file, can be validly read out again and that virtually no information data have been lost due to the unscheduled interruption.

In both cases there is the additional advantage that it is not necessary to check the concatenation of all data storage areas of the hard disk, so that the storage management method according to the invention can also be used for a hard disk with a TByte (Terra Byte) storage capacity.

In both cases there is the additional advantage that no data storage areas remain identified as occupied—that is to say as no longer unassigned—so that effective use can be made of the storage capacity of the mass storage.

The measures as claimed in claim 2 afford the advantage that a commercially very common structure is used for the management storage areas, which is known, for example as FAT12, FAT16 or FAT32.

The measures as claimed in claim 3 afford the advantage that the backup data can be easily and reliably determined.

The measures as claimed in claim 4 and claim 9 afford the advantage that the limited management storage area is utilized effectively and is entirely compatible with management storage areas defined in various operating systems.

The measures as claimed in claim 5 and claim 10 afford the advantage that in accordance with a "Hardware White Paper FAT" (Version 1.02, May 5, 1999, Microsoft Corporation) a "Bit ClnShutBitMask" forming completion data is defined, which contains the value "1" when writing of the concatenation data has been validly completed, and which contains the value "0", when writing of the concatenation data has not been validly completed. Accordingly, the backup means can check this bit following an unscheduled interruption and can perform the previously described check on the backup data only if it contains the value "0".

The measures as claimed in claim 6 afford the advantage that for the first time directory data are also protected against loss in the event of an unanticipated interruption. Furthermore, the associated directory data are determined as valid directory data according to which concatenation data have been recognized as valid concatenation data. This affords the advantage that the valid concatenation data determined by the backup means and the valid directory data always match and relate to the same information data storage state.

The invention will be further described with reference to examples of embodiments shown in the drawings to which, however, the invention is not restricted.

Figure 1:
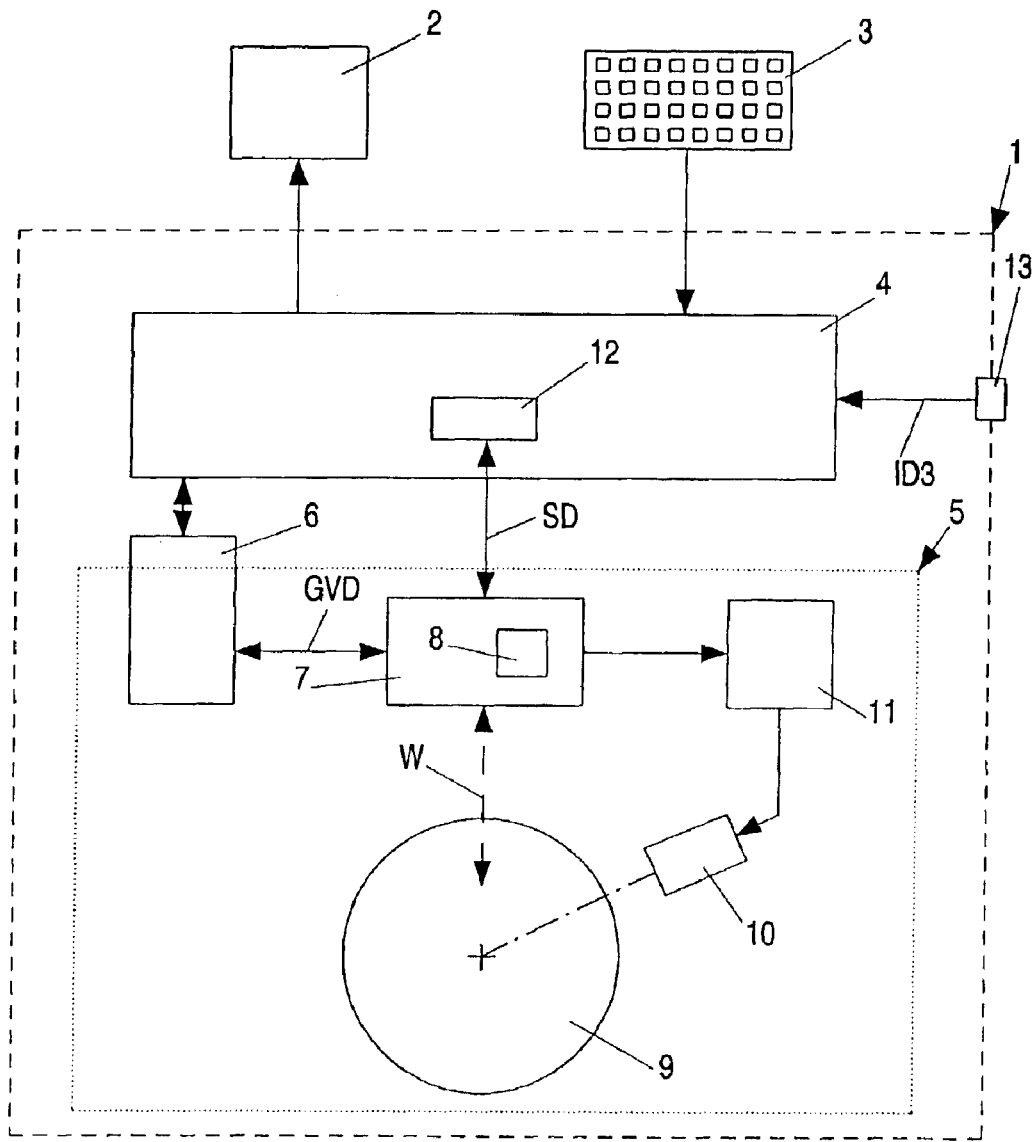
FIG. 1 shows a computer, which has a hard disk as mass storage, which has backup means for preventing a loss of information data in the event of an unanticipated interruption in the writing of concatenation data.

FIG. 1 shows a computer 1, to which a monitor 2 and a keyboard 3 are connected. The computer 1 is designed to store and run commercial computer programs—such as a word processing program, a spreadsheet program or a databank program, for example. The computer 1 is also designed for the processing and storage of so-called files (e.g. audio files, text files, data bank files, . . . ) for running such computer programs.

For this purpose, the computer 1 has processing means 4, for running the computer program and for the processing of files, and a hard disk stage 5, for the storage of computer programs and files. The processing means 4 contain a standard commercial processor (e.g. Intel Pentium III®) and a RAM (Random Access Memory) forming buffer storage means 6, together with the usual associated wiring for these components, which will therefore not be explored in further detail here.

A part of the buffer storage means 6 is to be assigned to the hard disk stage 5 and the hard disk stage 5 further contains input/output means 7 with storage control means 8, storage disks 9, a motor 10 and a motor control 11. The storage disks 9 form a mass storage, to which data can be magnetically written or stored by the input/output means 7 via an operative connection W and also read out again, as is generally known in the art. For writing data to a specific storage area of the storage disks 9 and reading it out, the motor control 11, which controls the motor 10, brings the storage disks 9 into the corresponding position—not shown in FIG. 1—relative to magnetic heads.

The hard disk stage 5 forms a storage management device and runs a storage management method. The hard disk stage 5 is designed for the management of storage areas of the storage disks 9, it being possible with the storage disks 9 to store concatenation data VD in management storage areas VSB, which define a concatenation of data storage areas DSB, in which associated information data ID can be stored on the storage disks 9. Information data ID here include both data stored in files and also the program code for the computer programs together with any other data containing information, which is explored further below.

Storage areas of the storage disks 9 have been divided into a so-called formatting sequence according to a FAT32 storage system (File Allocation Table 32) into clusters each of 32 kByte. The FAT32 storage system is in widespread use as a further development of a FAT12 and FAT16 storage system and is described, for example, in a "Hardware White Paper FAT" (Version 1.02, May 5, 1999, Microsoft Corporation). The FAT32 storage system allocates certain clusters to the management storage area VSB and the remainder of the clusters to the data storage area DSB.

Figure 2:
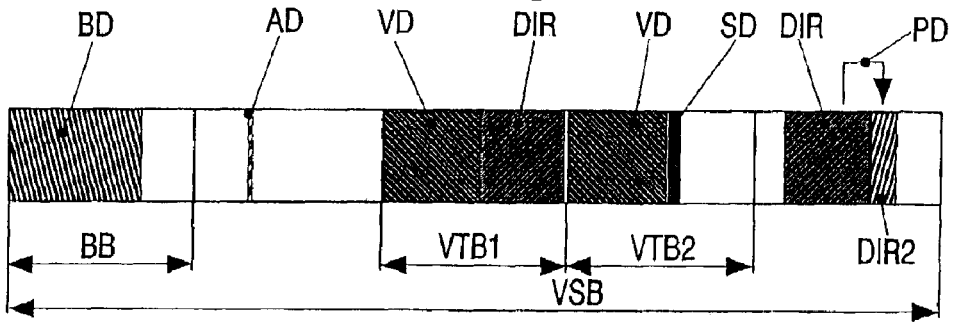
FIG. 2 shows a management storage area stored on the hard disk of the computer in FIG. 1, in which the concatenation data are stored.

FIG. 2 represents an example of data that can be stored in the management storage area VSB and FIG. 3 and FIG. 4 examples of information data that can be stored in the data storage area DSB, which will be explored in more detail below with reference to an exemplary application of the computer 1.

The storage control means 8 are designed for determining data storage areas DSB identified as unassigned by the concatenation data VD and for determining modified concatenation data GVD, which identify a concatenation modified by writing information data ID to be stored to unassigned data storage areas DSB. This will be explored in more detail below with reference to an exemplary application.

The input/output means 7 form writing means for writing information data ID to be stored to unassigned data storage areas DSB determined by the storage control means 8 and for writing all the modified concatenation data GVD to a first concatenation subarea VTB1 and a second concatenation subarea VTB2 of the management storage area VSB. This will likewise be explored in more detail below with reference to an exemplary application.

In addition to the hard disk stage 5, the storage management device according to the invention also contains backup means 12, which are formed by a part of the processing means 4. The backup means 12 are intended for determining backup data SD identifying the modified concatenation data GVD to be written in. The input/output means 7 of the storage management device according to the invention are furthermore designed, before writing the modified concatenation data GVD to the first concatenation subarea VTB1 and/or the second concatenation subarea VTB2, to write the backup data SD to a backup subarea of the management storage area VSB, and the backup means 12 are additionally designed, following an unscheduled interruption in writing the modified concatenation data GVD, to determine by reference to the backup data SD the valid concatenation data VD or GVD from the first concatenation subarea VTB1 or the second concatenation subarea VTB2. The storage management device according to the invention advantageously affords particularly high data integrity for information data ID stored or to be stored on the hard disk stage 5, which will be explored in more detail with reference to the following exemplary application.

In the exemplary application it is assumed that audio and video data of a television recording are delivered to the computer 1 via a socket 13, the data being coded according to MPEG standard and forming the information data ID. A user of the computer 1 wishes to store the information data ID received from the television recording on the hard disk stage 5.

Boot data BD in a boot storage area BB are stored in the clusters of the management storage area VSB of the storage disks 9. These boot data BD are read out by the processing means 4 immediately after switching on the computer 1, in order to start the operating system program (e.g. Windows NT®).

Also stored in the management storage area VSB of the storage disk 9 are completion data AD, which are formed by a "Bit ClnShutBitMask" described in the "Hardware White Paper FAT". The completion data AD contain the value "1" if writing of the modified concatenation data GVD was validly completed, and contain the value "0" if writing of the modified concatenation data GVD was not validly completed. Directory data DIR are furthermore stored in the first concatenation subarea VTB1 of the management storage area VSB. The directory data DIR contain the name, information on size and a start address of the first sector of the data storage areas DSB, identified by the concatenation data VD as belonging thereto, for all associated information data ID in a file or a computer program stored on the storage disks 9.

Figure 3:
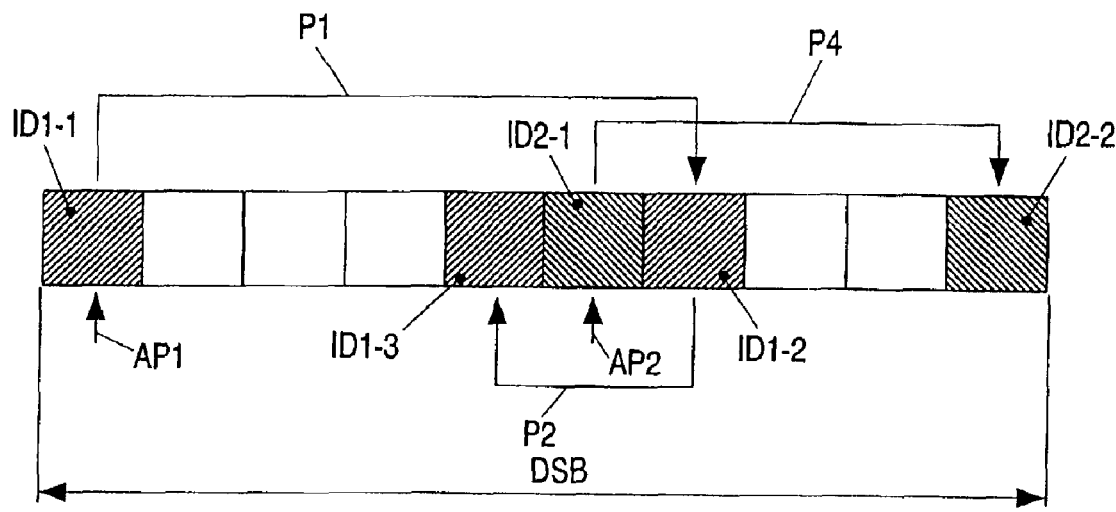
FIG. 3 shows a data storage area stored on the hard disk of the computer in FIG. 1, in which information data are stored.

The data storage areas DSB represented in FIG. 3 store first information data ID1 of a text file and second information data ID2 of an audio file. The size of the text file is 80 kByte, for which reason the first information data ID1 of the text file are stored in three associated data storage areas. The name of the text file "Budget2001", the size of 80 kByte and a first start address AP1, indicating the first sector of the data storage area DSB represented in FIG. 3, are stored in the directory data DIR. The first part of the first information data ID1-1 is stored in this first sector, the second part of the first information data ID1-2 in the seventh sector of the data storage area DSB and the third part of the first information data ID1-3 in the fifth sector of the data storage area DSB.

The concatenation data VD stored in the first concatenation subarea VTB1 and as backup copy again in the second concatenation subarea VTB2 contain a first pointer P1 and a second pointer P2, which form the concatenation of the associated data storage areas DSB of the first information data ID1. The first pointer P1 concatenates the first sector and the seventh sector and the second pointer concatenates the seventh sector with the fifth sector of the data storage area DSB.

If the user wishes to edit the text of the text file "Budget2001" using the word processing program and selects file–>Open–>"Budget2001" for this purpose, the processing means 4 issue a corresponding command to the input/output means 7. The storage control means 8 thereupon activate the motor control stage 11 for reading out the directory data DIR and the concatenation data VD from the storage disks 9, whereupon the input/output means 7 read out the directory data DIR and the concatenation data VD from the storage disks 9 via the operative connection.

From the directory data DIR the input/output means 7 determine the first start address AP1 stored for the name "Budget2001" and from the concatenation data VD the first pointer P1 and the second pointer P2. The storage control means 8 thereupon activate the motor control stage 11 for reading out the first part of the first information data ID1-1 from the first sector, for reading out the second part of the first information data ID1-2 from the seventh sector and for reading out the third part the first information data ID1-3 from the fifth sector. The input/output means 7 assemble these three parts of the first information data ID1 and deliver the first information data ID1 of the text file "Budget2001" to the processing means 4.

Due to their smaller size in comparison to the text file, the second information data ID2 of the audio file are only divided into two parts and are stored in the sixth sector and the tenth sector as associated data storage areas DSB. The second information data ID2 can be correspondingly read out with a second start address AP2 stored in the directory data DIR and a fourth pointer P4 stored in the concatenation data VD.

According to the exemplary application it is now assumed that the user activates the storage for information data ID received at the socket 13 under the name "Film 1", these data then being stored as third information data ID3 on the storage disks 9, as described below. For the time being, the processing means 4 perform any necessary processing of the received third information data ID3 and deliver the processed third information ID3 to the input/output means 7 for storage. The storage control means 8, then determine, by checking the concatenation data VD, which cluster of the data storage area DSB is still unassigned, that is to say are not storing any information data ID. In the process the input/output means detect that the second sector is unassigned and the storage control means 8 store modified directory data GDIR in the buffer storage means 6. The modified directory data GDIR contain an additional third entry with the name "Film 1" and the third start address AP3.

Figure 4:
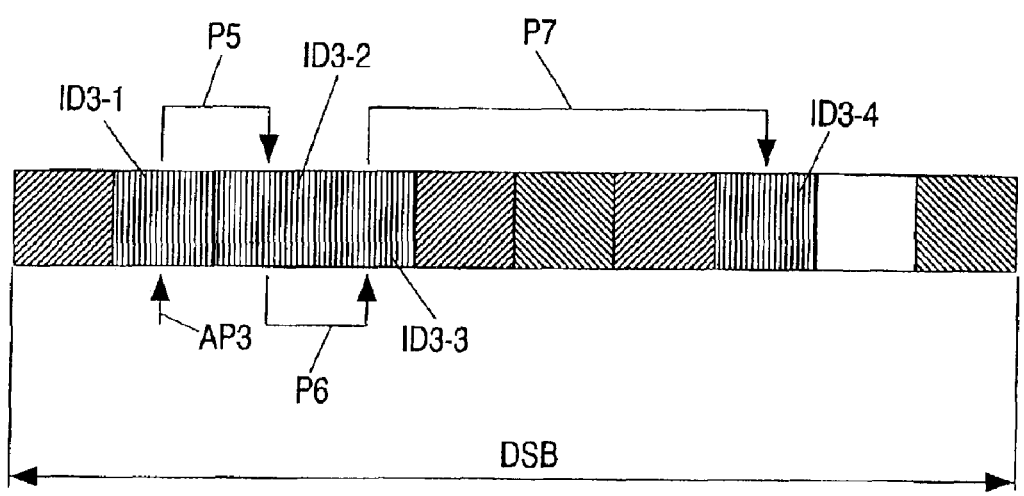
FIG. 4 shows the data storage area stored on the hard disk of the computer in FIG. 1, in which third information data are also stored in addition.

The input/output means 7 then begin to store the processed third information data ID3 in the second sector, as is shown in FIG. 4. Just before it is no longer possible to store any more third information data ID3 in the second sector, the storage control means 8 detect that the third sector is still unassigned, and the storage control means 8 store modified concatenation data GVD in the buffer storage means 6. In addition to the concatenation data VD stored in the first concatenation subarea VTB1 and as backup copy in the second concatenation subarea VTB2, the modified concatenation data GVD contain a fifth pointer P5.

FIG. 4 represents the data storage area DSB of the storage disks 9 after the third information data ID3 have been stored in the second, third, fourth and eighth sector. According to the exemplary application it is now assumed that the input/output means 7 store the modified directory data GDIR and the modified concatenation data GVD in four clusters in the management storage area VSB of the storage disks 9 immediately after storage of information data ID, at the latest. This is necessary since, in the event of a power failure, for example, the buffer storage means 6 lose all data stored in the buffer storage means 6. It might therefore be no longer possible to access the information data ID stored on the storage disks 9 and identified by the modified directory data GDIR and the modified concatenation data GVD.

Before overwriting the directory data DIR in the first concatenation data area VTB1 with the modified directory data GDIR, the input/output means 7 now copy the directory data DIR to an unassigned storage area of the management storage area VSB. This affords the advantage that even if an unanticipated interruption occurs during the overwriting of the directory data DIR in the first concatenation data area VTB1 with the modified directory data GDIR, the original directory data DIR can be recovered. This advantageously makes it possible, in the event of such an unanticipated interruption, to avoid losing all start addresses AP of information data ID stored on the storage disks 9.

Furthermore, before overwriting the concatenation data VD stored in the first concatenation subarea VTB1 with the modified concatenation data GVD stored in the buffer storage means 6, a backup copy of the concatenation data VD is stored in the second concatenation subarea VTB2. In addition, the backup means 12 now determine a checksum for the modified concatenation data GVD and store this as backup data SD in the second concatenation subarea VTB2.

If a backup copy of the directory data DIR has been stored in the management storage area VSB and a backup copy of the concatenation data VD in the second concatenation subarea VTB2, the value "0" is stored in the completion data AD before starting to store the modified concatenation data GVD and the modified directory data GDIR. The input/output means 7 then temporarily overwrite the directory data DIR in the first concatenation subarea VTB1 with the modified directory data GDIR. Furthermore, the concatenation data VD stored in the first concatenation subarea VTB1 are then overwritten with the modified concatenation data GVD, after which the backup copy of the concatenation data VD stored in the second concatenation subarea VTB2 is overwritten with the modified concatenation data GVD, before the backup copy of the directory data DIR stored in the management storage area VSB is finally overwritten with the modified directory data GDIR. The input/output means 7 store the value "1" in the completion data AD as completion of a successfully completed storage of the modified concatenation data GVD and the modified directory data GDIR.

According to the exemplary application it is now assumed that, whilst the input/output means 7 are storing the modified concatenation data GVD to the first concatenation subarea VTB1, the power for the computer 1 fails. After restarting of the computer 1, the input/output means 7 read out the completion data AD from the management storage area VSB and determine that these contain the value "0" and that therefore the writing of the modified concatenation data VD and the modified directory data GDIR was not completed successfully.

This affords the advantage that determination of the valid concatenation data VD and the valid directory data DIR as described below is only undertaken if this is actually necessary, so that in normal operation the user of the computer 1 incurs no additional waiting times.

In order to determine the valid concatenation data VD, the backup means 12 check whether the backup data SD stored in the management storage area VSB correspond to backup data SD detected by the backup means 12 for the concatenation data VD stored in the first concatenation subarea VTB1. If the stored backup data SD correspond to the backup data SD detected, storage of the modified concatenation data GVD was unexpectedly interrupted only after successful completion of the storage of the modified concatenation data GVD in the first concatenation subarea VTB1, so that the concatenation data VD stored in the first concatenation subarea VTB1 are the modified concatenation data GVD and therefore form valid concatenation data VD.

Since the modified directory data GDIR have already been stored to the first concatenation subarea VTB1 before the modified concatenation data GVD, the directory data DIR stored in the first concatenation subarea VTB1 are recognized by the backup means 12 as valid directory data DIR.

This affords the advantage that, despite the unanticipated interruption in the storage of the modified concatenation data GVD, full access to all information data ID stored on the storage disks 9 and hence also to the stored third information data ID3 of the television recording, up to this point stored in the four clusters, is maintained. In this case the input/output means 7 store the modified concatenation data GVD, stored in the first concatenation data area VTB1, also in the second concatenation subarea VTB2, as completion of the determination of the valid concatenation data VD. The directory data DIR stored in the first concatenation subarea VTB1 are likewise copied to the management storage area as backup copy and the input/output means 7 store the value "1" in the completion data AD as completion.

If, on the other hand, the stored backup data SD do not correspond to the detected backup data, storage of the modified concatenation data GVD has been unexpectedly interrupted before successful completion of the storage of the modified concatenation data GVD in the first concatenation subarea VTB1, so that the concatenation data VD stored in the first concatenation subarea VTB1 are invalid. In this case the backup means 12 recognize the concatenation data VD stored in the second concatenation subarea VTB2 and the directory data DIR stored in the management storage area VSB as valid. The input/output means 7 now store these valid concatenation data VD and directory data DIR in the first concatenation subarea VTB1 and the input/output means 7 store the value "1" in the completion data AD as completion.

This affords the advantage that if the modified concatenation data GVD have not already been determined as valid concatenation data VD, then at least the concatenation data VD stored before the unanticipated interruption are recognized as valid concatenation data VD. The directory data DIR matching these valid concatenation data VD are the still unmodified directory data DIR, for which reason these unmodified directory data DIR are defined as valid directory data DIR. As a result, the input/output means 7 can re-access all information data ID stored on the storage disks 9, except for the most recently stored information data ID, in up to four clusters. The entries in the directory data DIR furthermore correspond to the files actually stored in full on the storage disks 9.

A particularly advantageous feature of the storage management device according to the invention and the storage management method according to the invention is the fact that, in order to recover valid directory data DIR and concatenation data VD, it has not been necessary to run a so-called Scandisk program, in which all concatenations of information data ID stored on the storage disks 9 have to be redetermined, which is virtually impossible, particularly in the case of large storage capacities of mass storages.

Also particularly advantageous is the fact that the input/output means 7 store the backup data SD to an unassigned storage area of the management storage areas VSB store, thereby making effective use of the limited management storage area and allowing it to remain fully compatible with management storage areas defined in various operating systems.

In the exemplary application above, a backup copy of the modified data was stored both before storage of the modified concatenation data GVD and the modified directory data GDIR and also as completion of the storage. It would have been sufficient, however, to store the backup copies at only one of these instants—either before or after storage of the modified concatenation data GVD and the modified directory data GDIR in the first concatenation subarea VTB1.

It may be mentioned that the mass storage might also be formed by a DVD-RW or a read-only memory.

It may be mentioned that the storage management device according to the invention can be used in any known operating system.

It may be mentioned that the advantages according the invention accrue particularly in the case of interchangeable media, such as a hard disk, for example, which the user can take out of a computer and insert into another computer. This is because interchangeable media are often taken out of the computer even whilst storage is still in progress, which corresponds to an unanticipated interruption of the storage process. Maintaining the compatibility of the data in the management storage area ensures that even where the interchangeable medium is inserted into a computer that has no storage management device according to the invention, the computer does have the facility for recovering the concatenation data VD and directory data DIR with the aid of the checkdisk program, for example, albeit less successfully and taking a longer period of time.

It may be mentioned that there are many possible forms of unanticipated interruption to the storage of modified concatenation data GVD. Apart from a power failure or the removal of an interchangeable medium, an unanticipated interruption would occur in the event of a sudden defect of the hard disk.

It may be mentioned that the backup means for the directory data might also determine backup data, in order to determine the valid directory data from the backup data in the event of an unanticipated interruption. It may be further mentioned that a plurality of possible methods of calculation (e.g. formation of a horizontal checksum or calculation of a hash table) for the determination of backup data for a data area will be known to the person skilled in the art.

What is claimed is:

1. A storage management device for managing storage areas of a mass storage, it being possible by means of the mass storage to store concatenation data in management storage areas, which define a concatenation of data storage areas in which associated information data can be stored by the mass storage, having storage control means for determining data storage areas identified by the concatenation data as unassigned, and for determining modified concatenation data, which identify a concatenation modified by writing information data to be stored to unassigned data storage areas, and having buffer storage means for buffer storing the modified concatenation data, and having writing means for writing the information data to be stored to unassigned data storage areas determined byte storage control means and for writing all the modified concatenation data to a first concatenation subarea and a to second concatenation subarea of the management storage area, wherein;

backup means are provided for determining backup data identifying the modified concatenation data to be written, and in that the writing means are designed, before writing the modified concatenation data to the first and the second concatenation subarea, to write the backup data to a backup subarea of the management storage area, and in that the backup means are designed, following an unscheduled interruption in writing the modified concatenation data, to determine using the backup data whether the concatenation data stored in the first concatenation subarea or in the second concatenation subarea form valid concatenation data.

2. A storage management device as claimed in claim 1, wherein the first and the second concatenation subarea contain concatenation data of a so-called File Allocation Table.

3. A storage management device as claimed in claim 2, wherein the writing means are designed to write the backup data to apart of the first concatenation subarea and/or of the second concatenation subarea not occupied by the File Allocation Table.

4. A storage management device as claimed in claim 2, wherein the backup means are designed, following an unscheduled interruption in writing of the modified concatenation data, to check completion data stored in the File Allocation Table, which identify whether writing of the modified concatenation data was validly completed before the unscheduled interruption, the backup means being designed to determine the valid concatenation data stored in the concatenation subareas by reference to the backup data only after an invalid completion of writing the modified concatenation data.

5. A storage management device as claimed in claim 1, wherein the backup means are designed to determine a checksum of the modified concatenation data as backup data.

6. A storage management device as claimed in claim 1, characterized in that directory data, which in each case contain a start address for all data storage areas identified by a concatenation as belonging thereto, can be stored in the management storage areas, and in that directory data modified by writing in information data to be stored can be stored by the buffer storage means and in that before writing the modified directory data stored in the buffer storage means to the management storage area, the writing means copy the directory data already stored in the management storage area to an unassigned part of the management storage area, and in that the backup means following an unscheduled interruption in writing the modified concatenation data, are designed to determine the valid directory data according to the result of determining the valid concatenation data.

7. A storage management device as claimed in claim 1, wherein the storage management device is formed by a computer, which performs a storage management method.

8. A storage management method for managing storage areas of a mass storage, it being possible by means of the mass storage to store concatenation data in management storage areas, which define a concatenation of data storage areas, in which associated information data can be stored on the mass storage, the method comprising the steps of:

determining data storage areas identified by the concatenation data as unassigned;

determining modified concatenation data, which identify a concatenation modified by writing information data to be stored into unassigned data storage areas;

buffer storing of the modified concatenation data;

writing the information data to be stored to unassigned data storage areas determined;

writing all the modified concatenation data to a first concatenation subarea and to a second concatenation subarea of the management storage area.

the method comprising the further steps of:

determining the backup data identifying the modified concatenation data to be written in;

writing the backup data to a backup subarea of the management storage area before writing the modified concatenation data to the first and the second concatenation subarea;

determining using the backup data, following an unscheduled interruption in writing the modified concatenation data, whether the concatenation data stored in the first concatenation subarea or in the second concatenation subarea form valid concatenation data.

9. A storage management method as claimed in claim 8, comprising the further steps of:

writing the backup data to a part of the first concatenation subarea and/or of the second concatenation subarea not occupied by a File Allocation Table.

10. A storage management method as claimed in claim 9, comprising the further steps of:

checking completion data stored in the File Allocation Table following an unscheduled interruption in writing the modified concatenation data, which completion data identify whether writing of the modified concatenation data was validly completed before the unscheduled interruption, it being determined by reference to the backup data only after an invalid completion of writing the modified concatenation data which of the concatenation data stored in the concatenation subareas was validly stored.

* * * * *